United States Patent
Dorzok

(10) Patent No.: US 7,350,769 B1
(45) Date of Patent: Apr. 1, 2008

(54) COLLAPSIBLE TREE STAND HOIST

(75) Inventor: Daniel Dean Dorzok, Kewaskum, WI (US)

(73) Assignee: 3D Outdoor Products, LLC, Milwaukee, WI (US)

( * ) Notice: Subject to any disclaimer, the term of this patent is extended or adjusted under 35 U.S.C. 154(b) by 0 days.

(21) Appl. No.: 11/770,182

(22) Filed: Jun. 28, 2007

(51) Int. Cl.
*B21F 9/00* (2006.01)

(52) U.S. Cl. ............... 254/261; 248/219.1; 248/230.4; 248/230.5

(58) Field of Classification Search ............... 254/261, 254/262, 263; 248/219.1, 219.4, 230.4, 230.5; 182/187, 188
See application file for complete search history.

(56) References Cited

U.S. PATENT DOCUMENTS

| | | | | |
|---|---|---|---|---|
| 750,750 | A | * | 1/1904 | Chandler .................... 254/252 |
| 800,744 | A | * | 10/1905 | Kimbro ...................... 254/256 |
| 1,264,357 | A | * | 4/1918 | Willmer ..................... 254/262 |
| 3,568,797 | A | * | 3/1971 | Hardy ........................ 182/142 |
| 4,694,934 | A | | 9/1987 | Erickson |
| 5,263,675 | A | * | 11/1993 | Roberts et al. .......... 248/219.4 |
| 5,332,063 | A | | 7/1994 | Amacker |
| 5,595,265 | A | | 1/1997 | Lebrocquy |
| 5,603,489 | A | | 2/1997 | Regal |
| 5,685,393 | A | * | 11/1997 | Early ......................... 182/133 |
| 5,803,694 | A | | 9/1998 | Steele |
| 5,908,084 | A | | 6/1999 | Laurin et al. |
| 6,053,190 | A | | 4/2000 | Brown, Jr. et al. |
| 6,182,946 | B1 | | 2/2001 | Rutherford |
| 6,471,269 | B1 | | 10/2002 | Payne |
| 6,663,065 | B1 | | 12/2003 | Whittenburg |
| 2005/0247525 | A1 | | 11/2005 | Thorton |

* cited by examiner

*Primary Examiner*—Emmanuel M Marcelo
(74) *Attorney, Agent, or Firm*—Reinhart Boerner Van Deuren s.c.

(57) ABSTRACT

A collapsible tree stand hoist including an elongated pole, a stationary arm secured to the distal end thereof and a movable arm configured to slide back and forth along the length of the elongated pole is provided. Each of the arms include teeth or serrations for grasping and securing the hoist to the trunk of a tree. In a first configuration, the stationary arm and the movable arm are configured to fold up and pivot inwardly, providing a compact hoist device that is easily unfolded and set up on site. In a second configuration, the stationary arm and the movable arm are configured to be removed from the elongated pole, providing a collapsed position that permits the hoist to be easily carried in a compact fashion.

22 Claims, 12 Drawing Sheets

COLLAPSIBLE TREE STAND HOIST

BACKGROUND OF THE INVENTION

Field of the Invention

The present invention relates generally to tree stand hoisting equipment, and in particular to a compact, collapsible tree stand hoist.

Wild game hunting is a popular and widespread recreational sport, engaged in across the country by many individuals, young and old. In particular, in many parts of the country, deer hunting is considered a multigenerational family activity as well as a recreational sport. In some areas, deer hunting is also used as a method to control the deer population, providing environmental and herd protection.

In wooded areas, the most common method for hunting deer entails using a tree stand, which is a temporary platform mounted on to a tree above the eye level of the deer or game. In the tree stand, the hunter enjoys a greater view of the surrounding terrain in addition to having a substantially decreased chance of being spotted or scented by the deer.

Typically, a tree stand mounts on to a larger tree, at least eight to ten feet off the ground. In order to mount the tree stand to the tree, a hunter must climb the tree, using spiked climbing boots or by screwing spikes into the tree, while carrying the tree stand. Once at the desired height, the hunter must hold on to the tree while mounting the tree stand to the trunk of the tree. The hunter must climb down the tree to get his rifle and other gear, or hoist the gear up from the ground. Alternatively, to install a tree stand on to a tree, a hunter climbs the tree with a pulley arrangement secured to the stand, and then pulls the tree stand up to the desired level and then assembles the stand while hanging on to the tree.

However, many of the tree stands in use are extremely heavy and are complicated to the point that it is quite a chore to get them up in trees. In addition, the hunter has to support the weight of the tree stand while mounting it onto the trunk of the tree without falling out of the tree, a feat which requires considerable dexterity as well as considerable strength and patience.

Accordingly, there is a need for a safe and simple apparatus for assisting a hunter in climbing the tree, lifting the tree stand to the desired height and setting up the tree stand. In particular, there is a need for a tree stand hoisting apparatus that also provides a stable and secure support in which the hunter may use to hoist, assemble and install the tree stand at an elevation above the ground.

As such, the primary objective of the present invention is to provide a compact and portable tree stand hoist, that is lightweight and easy to carry along on hunting excursions, in addition to the tree stand and other hunting gear that the hunter must carry. It can be a related objective of the present invention to provide a tree stand hoist that can be installed onto a tree trunk while the user is on the ground, and can be used to climb the tree, hoist the tree stand to the desired height and support the tree stand and the hunter while the tree stand is being installed.

It is another objective of the present invention to provide a lightweight, collapsible tree stand hoist that is of a foldable construction, rendering it easy to transport for long distances or over rough terrain, and easy to set up for installation on to the tree. It can be another object of the present invention to provide a collapsible tree stand hoist having removable arms, the tree stand hoist providing a safe and secure method for lifting a tree stand into an elevated position on a tree trunk. The tree stand hoist having removable arms is rapidly assembled, easy to install onto a tree from a ground position, sturdy enough to maintain the hunter's weight while the tree stand is lifted and installed into position, easy to remove from the tree and quickly disassembled when hunting is completed.

The tree hoist apparatus of the present invention is both durable and long lasting, and requires little or no maintenance to be provided by the user throughout its operating lifetime. In order to enhance the market appeal of the apparatus of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, a collapsible tree stand hoist device is provided, including, in its simplest form a substantially linear pole or elongated member, a stationary arm secured to a first end of the elongated member and a movable arm, comprising a pulley mechanism, slidably positionable along the length of the elongated member. It will be appreciated by those skilled in the art that the term "collapsible" can refer to either embodiment of the present invention, including a first, foldable tree stand hoist, and a second hoist having removable arms/portions.

The elongated member is preferably a straight tubular member including a plurality of apertures configured to engage a positioning mechanism on the movable arm. The apertures are spaced apart along the length of the elongated member and are of a size corresponding to the positioning mechanism. A slot or opening for movably accommodating a rope is also provided near the distal end of the elongated member.

The second end of the elongated member includes a coupling having an opening for receiving and securing an extension pole or member. The extension member is expandable and is preferably telescoping, and therefore can be expanded or retracted to any length appropriate for the desired positioning and height of the tree stand.

In certain preferred embodiments, the stationary arm is pivotally secured to the distal end of the elongated member by a flange. The stationary arm is substantially V-shaped and includes first and second substantially linear portions, respectively. The stationary arm is configured to fold up and/or pivot at its apex.

Each of the first and second linear portions includes a plurality of projecting serrations or teeth, respectively, for gripping the trunk of the tree and securing the hoist into place during use. The number and precise shape of the teeth along each of the linear portions, respectively, will depend on the size of the stationary arm and the particular application of the hoist. A spring-loaded finger is pivotally secured near the end of the stationary arm. The finger biases outwardly so that it easily retracts or opens after assembly of the hoist 30.

In certain preferred embodiments, the movable arm is slidably secured to the elongated member by a flange. The flange is preferably the same shape as the elongated member, and therefore is preferable tubular in shape and configured to fit around the outside of the elongated member. The flange permits the movable arm to slide back and forth from the distal end to the proximal end of the elongated member.

The flange includes a positioning mechanism for moving the movable arm and locking it into place along the length of the elongated member. Preferably, the positioning mechanism includes a retractable, spring-loaded locking pin having an end configured to engage one of the apertures along the length of the elongated member and a rope provided on the other end, for applying tension to release the locking pin from position. The locking pin is biased in a locked position, such that the end of the locking pin engages one of the apertures within the elongated member when there is no tension on the rope. When the rope is pulled, the locking pin is in a retracted position, permitting the movable arm to slide along the length of the elongated member.

Like the stationary arm, the movable arm is a substantially V-shaped member including first and second substantially linear portions and a hinged apex portion so that the first and second linear portions of the stationary arm can fold at and/or pivot about its apex when it is desired to fold up the tree stand hoist. Each of the first and second linear portions includes a plurality of projecting serrations or teeth for gripping the trunk of the tree during use of the tree stand hoist, therefore securing the hoist into place. A spring-loaded finger is pivotally secured to the end the movable arm. The finger biases outwardly so that it easily retracts or opens after assembly of the hoist 30.

The pulley mechanism is located substantially near the apex of the movable arm. The pulley mechanism includes a rope having a hook or clasp located at one end for attaching the tree stand or hunter's gear to the hoist and a handle secured to the other end of the rope for pulling/hoisting the tree stand up into position.

In a collapsed position, the stationary arm is folded at its apex and pivots about its flange towards the elongated member. Likewise, the movable arm is folded at its apex, and it is pivoted about is flange inwardly towards the elongated member. In this configuration, the hoist is compact and narrow, and easy to fit into a bag.

From this collapsed position, the flange on the stationary arm is pivoted, and the stationary arm is unfolded at its apex and locked into position using mechanical fasteners. The flange is also locked into position with respect to both the stationary arm and the elongated member using mechanical fasteners. Accordingly, the stationary arm is locked into position at the distal end of the elongated member and in its operational position.

The movable arm is pivoted away from the elongated member and unfolded at its apex and locked into position using mechanical fasteners. The flange is then locked into position with respect to the movable arm using mechanical fasteners. The movable arm is now in its operational position.

To install the tree stand hoist on to a tree, the movable arm is positioned a distance apart from the stationary arm so that the arms can easily fit around the girth or circumference of the tree trunk. This is done by positioning the movable arm, using the rope. When the rope is pulled, the locking pin retracts and the pin is no longer engaged or with the aperture in the elongated member. While there is tension on the rope, the movable arm may be slid away from the stationary arm providing enough space to easily surround the tree trunk. The movable arm can then be locked into this position by releasing the rope and causing the locking pin to engage the aperture in the elongated member.

With the extension member in place on the proximal end of the elongated member, the tree stand hoist is positioned, with the arms encompassing the tree trunk, at the desired height for the tree stand. Once properly positioned, the rope is again pulled, the locking pin retracts away from the aperture and the movable arm is slid along the length of the elongated member until it is tightly engaged with and/or contacting the trunk of the tree. When such secure engagement is made, the rope is released and the locking pin engages another one of the apertures in the elongated member, locking the movable arm in place. When the movable arm is in place, the proximal end of the elongated member can be lowered, causing the teeth on each of the arms to bite into or grip the trunk of the tree, further securing the tree stand hoist into place.

The tree stand is then attached to the hook; and the handle is pulled to lift the tree stand to the height of the arms in the tree, using the pulley mechanism. The rope is then secured to retain the tree stand at the desired height. The hunter may then climb the tree without the added weight of the tree stand and assemble the stand without bearing the weight of the stand during assembly.

When it is desired to remove the tree stand hoist from the tree, the hunter climbs down the tree, pulls on the rope to retract and disengage the locking pin from the elongated member. The movable arm is then slid away from the stationary arm and released from engagement with the tree using the extension member. The extension member is then removed and put into a retracted or compact configuration and the tree stand hoist is collapsed to its portable configuration.

In certain other embodiments of the present invention, the stationary arm and the movable arm are configured to be removable from the elongated pole or member, by removing the fasteners provided therewith. In this way, the arms can be removed and compactly carried within a rather narrow bag or kit. In this collapsed and portable position, the individual members of the tree stand hoist can then be easily carried in a compact fashion using a bag and then the hoist can be assembled on site.

To assemble a collapsible tree stand hoist having removable arms of the present invention, the movable arm is positioned on to the elongated member by sliding its integral flange on to the elongated member. For convenience, the movable arm can be locked into position near the proximal end of the elongated member while the rest of the hoist is assembled. The stationary arm is then slid on to the elongated member and is secured at the distal end thereof. A rope is then fed through a slot in the flange, over a pulley therein and then fed through an opening on the bottom surface of the elongated member to provide means for releasing the spring loaded locking pin.

Next, the extension member is positioned and secured to the proximal end of the elongated member Once the extension member is connected, the tree stand hoist is assembled and ready for use, as described above.

When it is desired to remove the tree stand hoist from the tree, the hunter climbs down the tree, pulls on the rope, which causes the locking pin to retract and disengage from the elongated member. The movable arm is then slid away from the stationary arm and the hoist is released from the tree using the extension member. When it is desired to transport the hoist, the extension member, and each of the arms are removed from the elongated member.

One skilled in the art will immediately recognize that the tree stand hoist devices of the present invention are preferably constructed of a substantially rigid material such as steel, aluminum or another metal material. Other materials, such as a composite material, may be used for any portion of the tree stand hoist, provided the material permits the arms to rigidly secure to the tree. In addition, the material must be of sufficient strength to withstand the weight of the tree stand, the hunter's gear and/or the hunter. However, the materials of construction preferably maximize strength while minimizing weight of the tree stand hoist, to ensure the hoist is lightweight and easy to carry. Further, one or more of the ropes used with the tree stand hoist of the present invention may be replaced with any type of cable or rope material, including cotton, nylon, metal wire or cable, or thermoplastic material, as long as the rope material is provided with sufficient strength to withstand the required load, as described above.

DESCRIPTION OF THE DRAWINGS

These and other advantages of the present invention are best understood with reference to the drawings, in which.

DETAILED DESCRIPTION OF THE PREFERRED EMBODIMENT

Although the disclosure hereof is detailed and exact to enable those skilled in the art to practice the invention, the embodiments herein disclosed merely exemplify the invention which may be embodied in other specific structures. In particular, the arms and extension members of the hoist of the present invention may be provided in any length or size, depending on the diameter of tree and/or location of application of the tree stand hoist. Accordingly, while the certain preferred embodiments have been described, the details may be changed without departing from the invention, which is defined by the claims.

Figure 1:
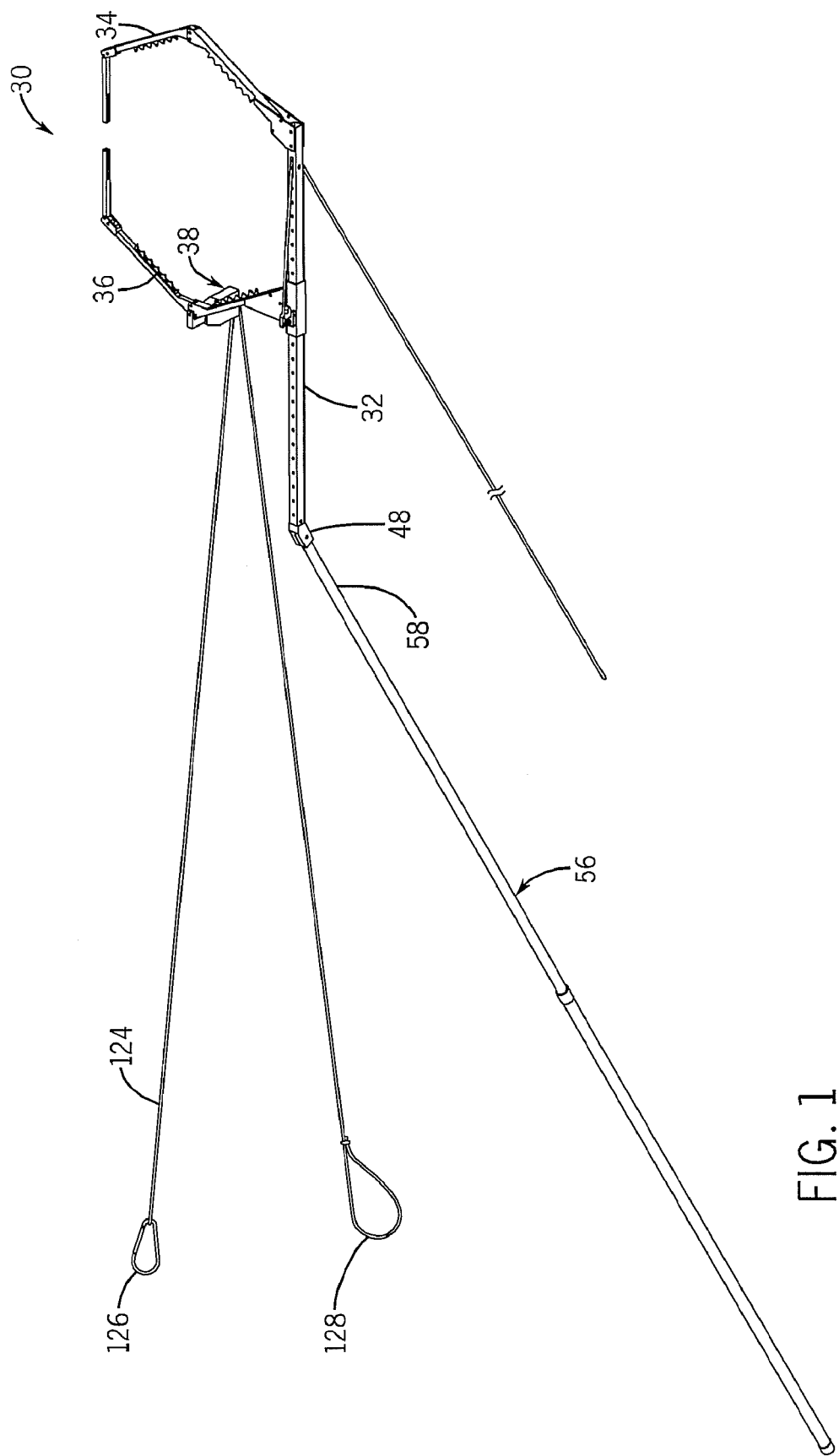
FIG. 1 is a perspective view of a first embodiment of a tree stand hoist of the present invention.
Figure 2:
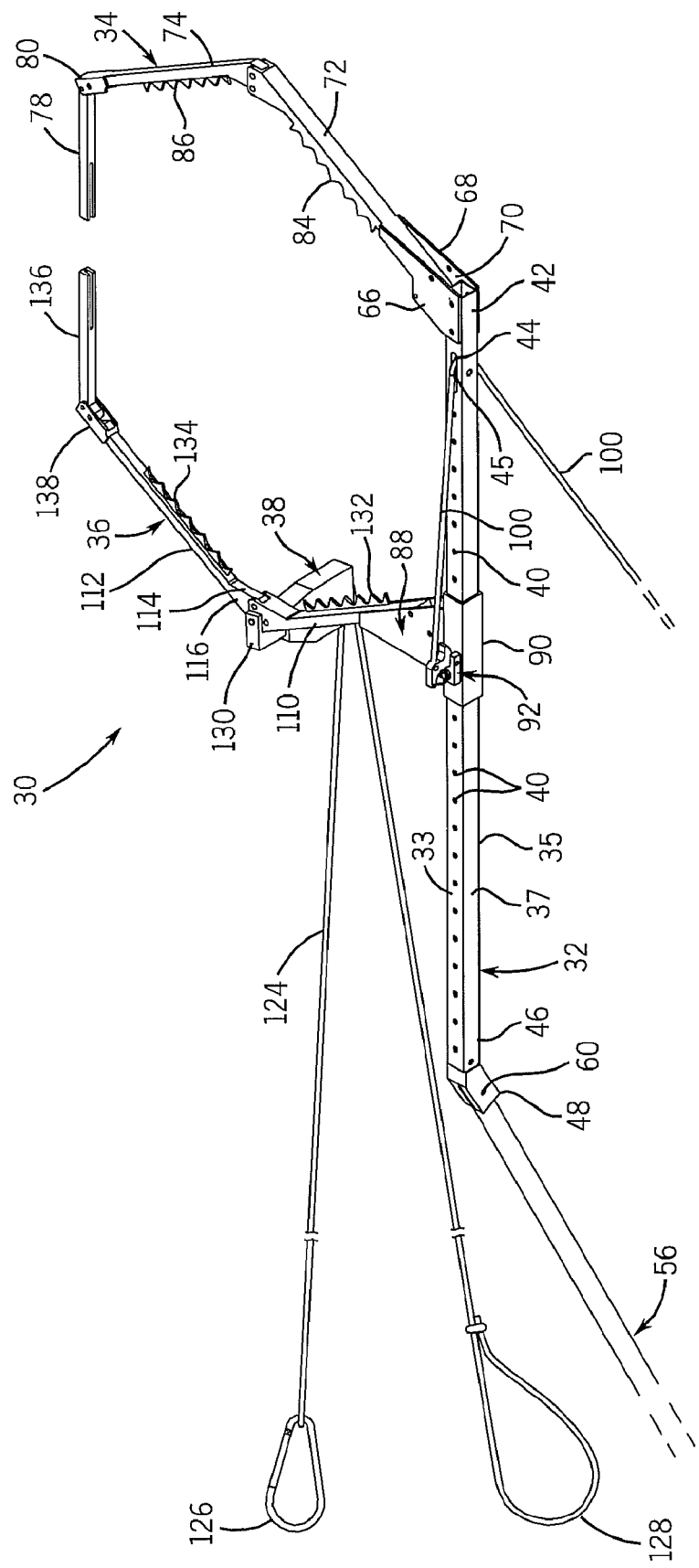
FIG. 2 is a partial perspective view of the tree stand hoist illustrated in FIG. 1.
Figure 3:
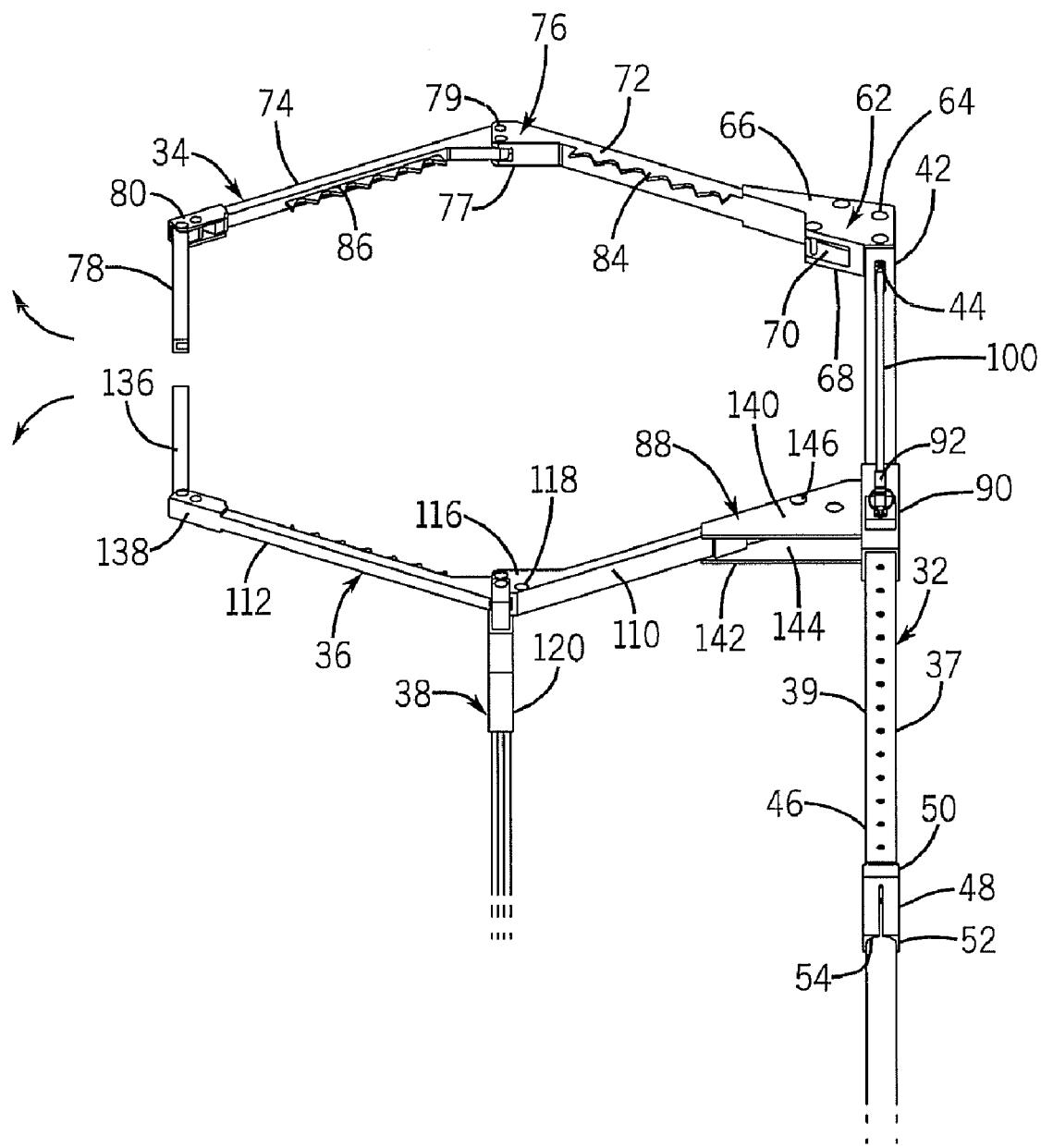
FIG. 3 is a front perspective view of the tree stand hoist illustrated in FIGS. 1 and 2.

FIGS. 1 through 8 will now be described with respect to a collapsible tree stand hoist 30 for engaging a tree 20. FIGS. 9 through 13 will then be described with respect to a second, collapsible tree stand hoist 230. Turning first to FIGS. 1 through 3, the tree stand hoist 30 of the present invention includes, in its simplest form, an elongated member 32, such as a hollow tube or pole, a stationary arm 34, a movable arm 36 and a hoist element 38, such as a pulley mechanism.

The elongated member 32 is preferably a straight tubular member having a first, distal end 42, a second, proximal end 46, a top surface 33, a bottom surface 35 and two side surfaces 37 and 39.

The top surface 33 includes a plurality of apertures 40 configured to engage a locking pin 94 on the movable arm 36 to allow the tree stand hoist 30 to accommodate trees of different diameters, as described in more detail below. The apertures 40 are preferably spaced apart and linearly aligned along the length of the elongated member 32. The apertures 40 are of a size corresponding to the locking pin, and the number of apertures will depend on the length of the elongated member 32 and the number of positions desired for the movable arm 36.

The distal end 42 of the elongated member 32 includes apertures (not shown) for pivotally securing the stationary arm 34 thereto. Preferably, the stationary arm 34 extends laterally from the side 39 of the elongated member 32. A slot or opening 44 in the top surface 33 of the elongated member 32 includes a pulley 45 for movably accommodating a rope 100. One skilled in the art will appreciate that the pulley 45 may be replaced with any component that permits the rope to move when it is desired to position the movable arm 36.

The proximal end 46 of the elongated member 32 includes a coupling 48. The coupling 48 has an end 50 secured to the elongated member 32 and an end 52 configured with an opening 54 for receiving and securing an extension member 56. Preferably, the extension member 56 is telescoping, and therefore can be expanded or retracted to any length appropriate for the desired positioning and height of the tree stand. The opening 54 in the coupling 48 is of the size and shape sufficient to receive an end 58 of the extension member 56. The coupling 48 can also include apertures 60 for removably securing the extension member 56 in place with pins, screws or the like (not shown).

A flange 62 secures the stationary arm 34 to the side 39 of the elongated member 32 at the distal end 42 thereof. In certain preferred embodiments of the present invention, the stationary arm 34 is substantially V-shaped and includes first and second substantially linear portions 72 and 74, respectively. The stationary arm 34 is foldable/collapsible and therefore includes a hinged portion 76 at its apex 77. The hinged portion 76 can include pins, mechanical snaps, rivets 79 or the like, and can be constructed in any manner that permits the first and second linear portions 72 and 74 of the stationary arm 34 to fold at its apex 77 and/or pivot about the apex 77 when it is desired to collapse the tree stand hoist 30.

Each of the first and second linear portions 72 and 74 includes a plurality of projecting serrations or teeth 84 and 86, respectively, for gripping the trunk of the tree and securing the hoist into place during use. The number and precise shape of the teeth 84 and 86 along each of the linear portions 72 and 74, respectively, will depend on the size of the stationary arm 34 and the particular application of the hoist. For example, certain state or local environmental regulations may only permit teeth that do not pierce or puncture the trunk, but rather, merely grip the trunk, and as such, the teeth 84 and 86 can be constructed accordingly, as is well known to those skilled in the art.

A finger 78 is pivotally secured with a hinge or pivot connector 80 to an end of the second linear portion 74. The finger 78 is preferably spring-loaded so that it biases outwardly, as illustrated in FIG. 3. Accordingly, the connector 80 may be of any construction that permits the finger to pivot and bias outwardly so that it easily opens to an operational position when the hoist is assembled.

Figure 7:
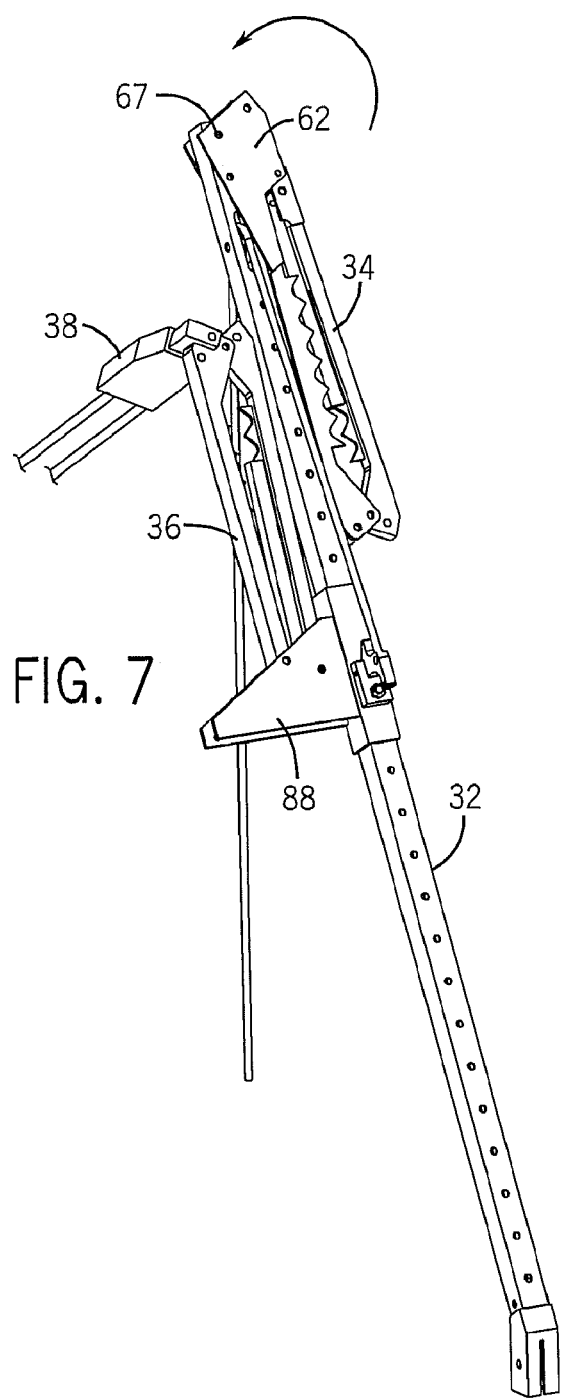
FIG. 7 is a perspective view of the tree stand hoist illustrated in FIGS. 1 through 5, shown in a collapsed position.
Figure 8:
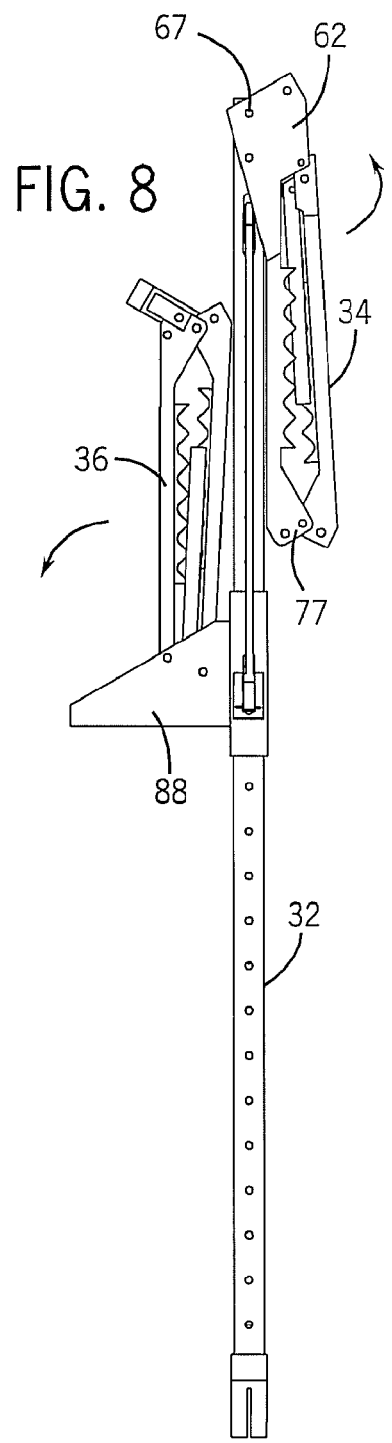
FIG. 8 is a plan view of the tree stand hoist illustrated in FIGS. 1 through 5, shown in the collapsed position.

The flange 62 is preferably pivotally secured to the stationary arm 34 by mechanical fasteners 64 such as pins, rods, rivets, snaps, bolts, screws or the like so that the arm 34 may be collapsed when the tree stand hoist 30 is not in use, as best illustrated in FIGS. 7 and 8. However, in its operational position, as illustrated in FIGS. 1 through 5, the stationary arm 34 is rigidly and non movably secured to the flange 62. In certain other embodiments, the flange 62 may be integrally formed with the stationary arm 34.

As best illustrated in FIGS. 2 and 3, the flange 62 includes a top portion 66, a bottom portion 68 and a central open portion 70. The top 66 and bottom 68 portions of the flange 62 are preferably pivotally secured to the elongated member 32 by inserting the elongated member 32 therebetween, and securing it in place with mechanical fasteners 64, such as pins, rods, rivets, snaps, bolts, screws or the like, into the corresponding apertures (not shown) in the distal end 42 of the elongated member 32.

The fasteners 64 stationarily secure the flange 62 during use of the hoist 30, and therefore, the stationary arm 34 is also stationarily secured place during use of the tree stand hoist 30. Removal or loosening of fasteners 64 allows the flange 62 to pivot (at 67 shown in FIGS. 7 and 8) when the tree stand hoist 30 is collapsed or not in use. The central open portion 70 of the flange 62 provides an area for receiving the folded/collapsed stationary arm 34 when the tree stand hoist 30 is collapsed or not in use, as also illustrated in FIGS. 7 and 8. Importantly, the pivotal relationship between the stationary arm 34 and the flange 62, and the flange 62 and elongated member 32 permits the stationary arm 34 to be compactly collapsed down to a minimal size.

A flange 88 slidably secures the movable arm 36 to the side 39 of the elongated member 32. Like the stationary arm 34, the movable arm 36 is a substantially V-shaped member including first and second substantially linear portions 110 and 112, respectively, and a hinged portion 114 at its apex 116. The hinged portion 114 may include pins, mechanical snaps, rivets 118 or the like, and can be constructed in any manner that permits the first and second linear portions 110 and 112 of the stationary arm 36 to fold at and/or pivot about the apex 116 when it is desired to fold up the tree stand hoist 30.

Each of the first and second linear portions 110 and 112 includes a plurality of projecting serrations or teeth 132 and 134, respectively, for gripping the trunk of the tree during use of the tree stand hoist 30, therefore securing the hoist 30 into place at the desired elevated level. The number and shape of the teeth 132 and 134 along each of the linear portions 110 and 112, respectively, will depend on the size of the movable arm 36 and the particular application of the hoist 30. For example, like the teeth 84 and 84 of the stationary arm, the teeth 132 and 134 can be configured so that they do not pierce or puncture the trunk, but rather, merely grip the trunk.

A finger 136 is pivotally secured with a hinge or pivot connector 138 to an end of the second linear portion 112 of the movable arm 36. The finger 136 is spring-loaded so that it biases inward, as illustrated in FIG. 3. Accordingly, the connector 138 may be of any construction that permits the finger to pivot and bias outwardly so that it easily opens to an operational position when the hoist is assembled.

Preferably, the hoist element 38 is located near the apex 116 of the movable arm 36, and includes a pulley-type mechanism. As such, the hoist element 38 includes a housing 120, a rotatable pulley 122 disposed therein, a ratchet mechanism 123 and a rope or cable 124. A hook or clasp 126 is located at one end of the rope 124 for attaching the tree stand 30 or hunter's gear to the hoist and a handle 128 is secured to the other end of the rope 124 for hoisting up the tree stand. The hook 126 and the handle 128 may be any type known to those skilled in the art, provided they are constructed to sustain the weight of the tree stand. The ratchet mechanism 123 allows the rope 124 to be secured in place once the tree stand is hoisted to the desired elevated position.

It will be appreciated by those skilled in the art that the hoist element 38 may comprise any component known to those skilled in the art that will permit the rope 100 to be slidably secured to one of the arms, such that when the tree stand is attached to the hook 126, applying tension to the handle 128 will result in the tree stand being lifted into the desired elevated position.

The hoist element 38 is secured to the movable arm 36 using a pivoting flange 130 so that the hoist element 38 may be moved to the appropriate angle when attaching the tree stand 30 to the rope 124 and during lifting of the tree stand. The pivoting flange 130 also permits the hoist element 38 to be moved out of the way when the hoist 30 is in its collapsed position.

In certain preferred embodiments, the pivotable flange 130 may permit the hoist element 38 to be removable from the movable arm 36, for ease of transport of the hoist 30. In addition, the rope 124, hook 126 and/or the handle 128 may be configured to be removable from the hoist element for ease of transport and for ease or repair and/or replacement.

Figure 4:
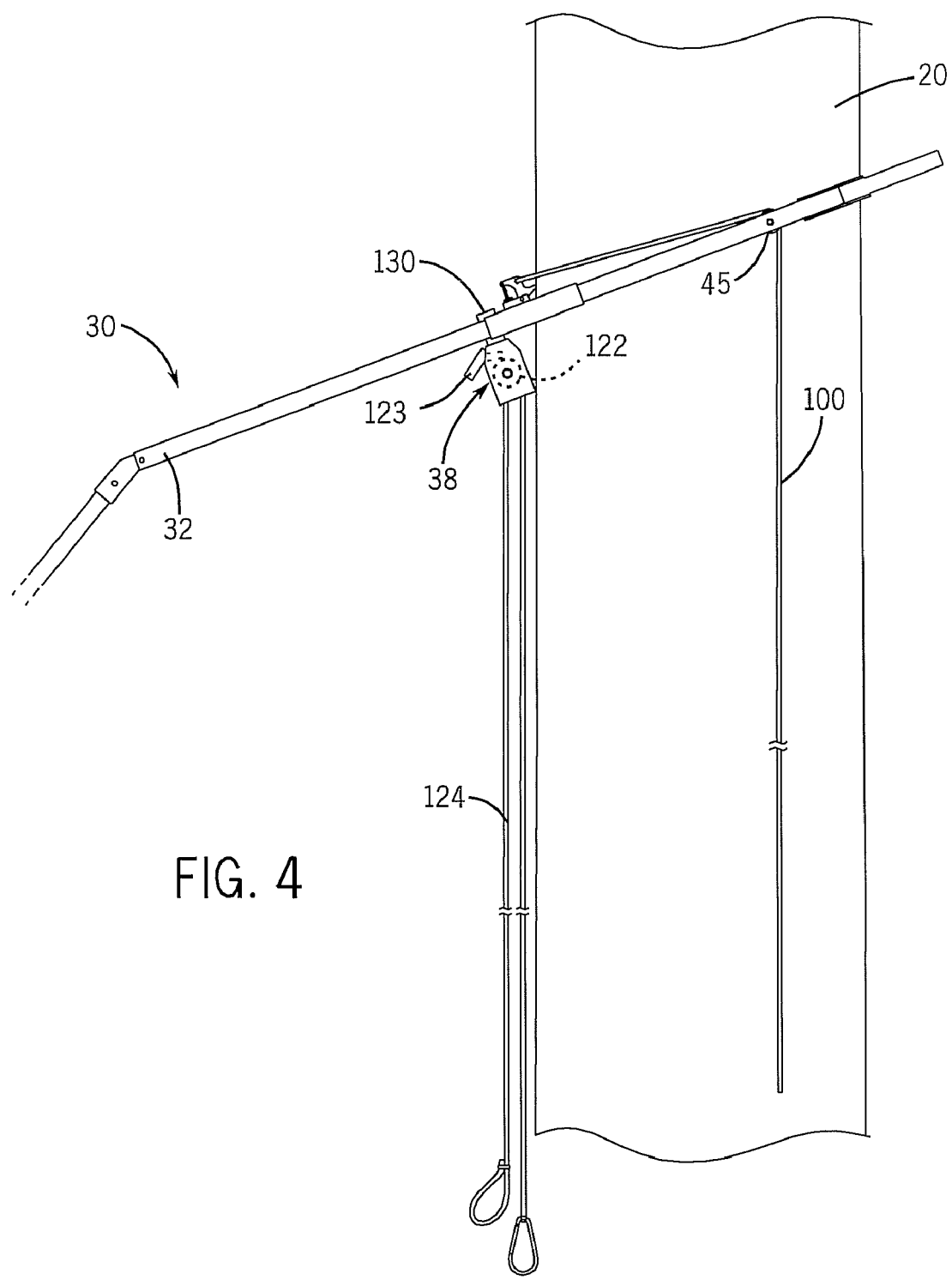
FIG. 4 is a side view of the tree stand hoist illustrated in FIGS. 1 through 3, shown secured to a tree.
Figure 5:
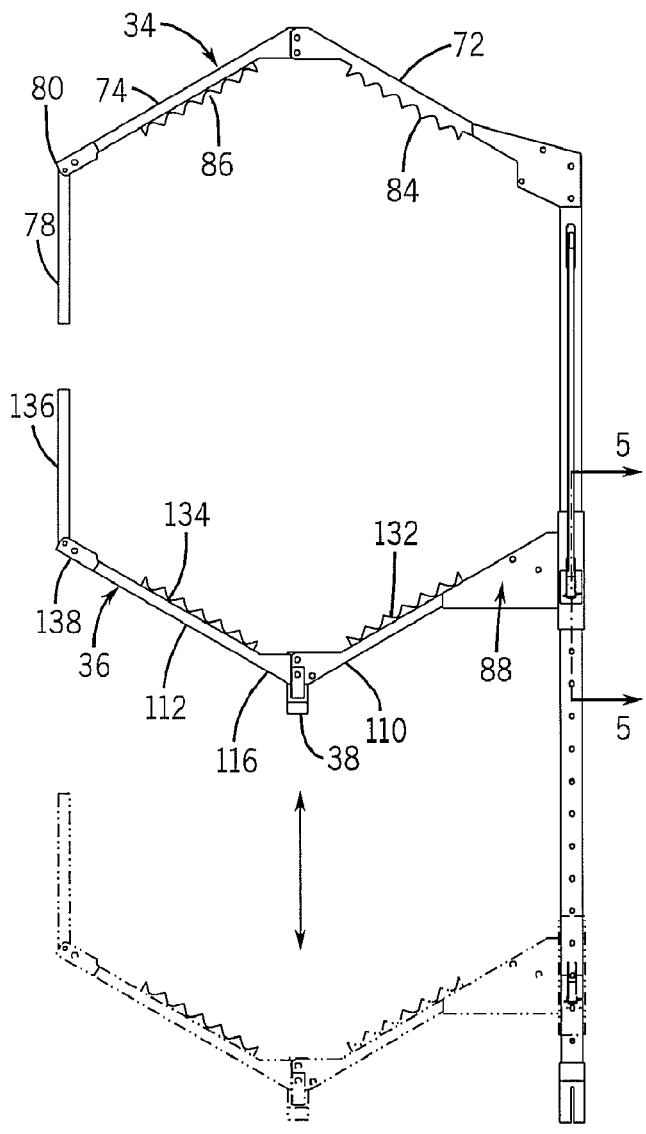
FIG. 5 is a top view of the tree stand hoist illustrated in FIGS. 1 through 4, showing a movable arm having a plurality of positions along the length of the elongated member.
Figure 6A:
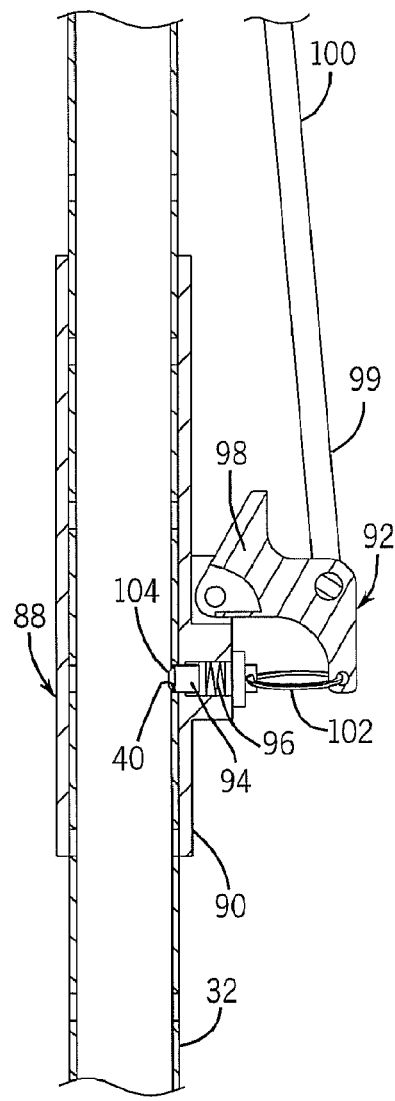
FIG. 6A is a partial view of the tree stand hoist illustrated in FIGS. 1 through 5, taken along the line 5-5, shown with a locking pin in a locked position.
Figure 6B:
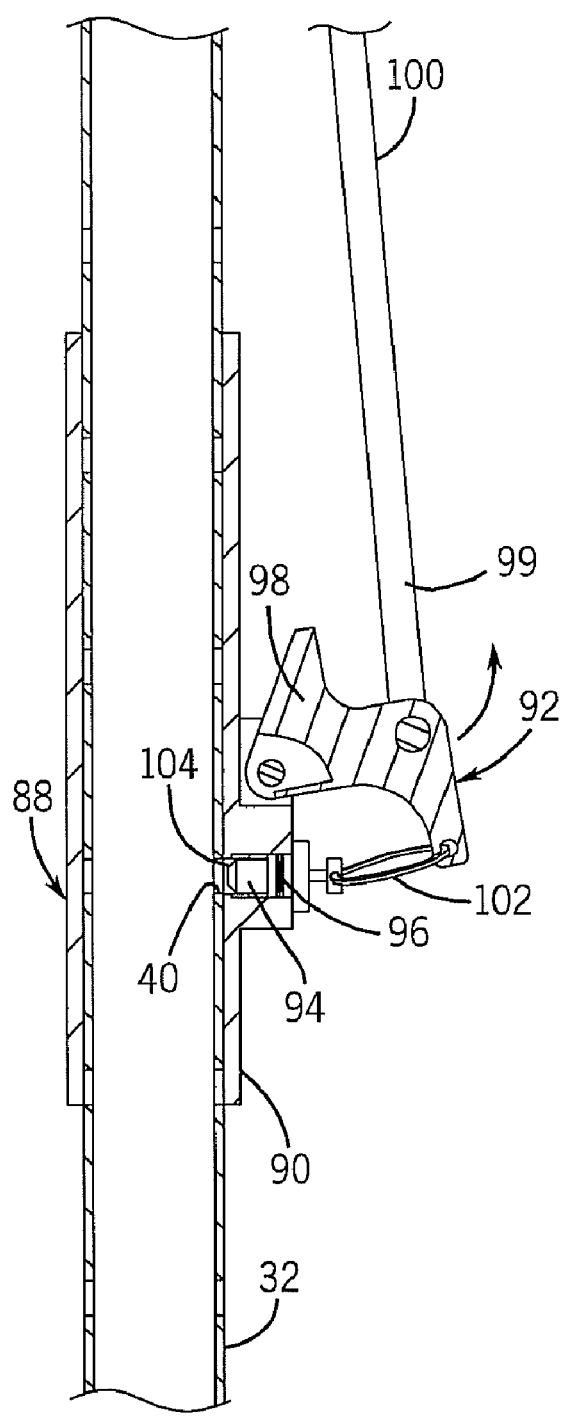
FIG. 6B is a partial view of the tree stand hoist illustrated in FIGS. 1 through 5, taken along the line 5-5, shown with a locking pin in a retracted position.

Turning now to FIGS. 5, 6A and 6B, in addition to FIGS. 1 through 4, the flange 88 preferably includes a tubular portion 90 configured to fit around the outside of the elongated member 32 and capable of sliding back and forth from the distal end 42 to the proximal end 46 of the elongated member 32.

As best illustrated in FIGS. 6A and 6B, the tubular portion 90 includes a positioning mechanism 92 for sliding the movable arm 36 to the desired position and locking it into place along the length of the elongated member 32. The positioning mechanism 92 includes a retractable, spring-loaded locking pin 94, including a biasing mechanism 96, such as a spring, a pivotable element 98 and a linkage 102, such as a ring, connecting the locking pin 94 to the pivotable element 98. An end 99 of the rope 100 is secured to the pivotable element, and is then threaded through the opening 44 in the elongated member 32.

As illustrated in FIG. 6A, the locking pin 94 is biased in a locked position, such that an end 104 of the locking pin 94 engages one of the apertures 40 within the elongated member 32 when there is no tension on the rope 100. As will be described below and as illustrated in FIG. 6B, when the rope 100 is pulled, the locking pin is in a retracted position, permitting the movable arm 36 to slide along the length of the elongated member 32.

The flange 88 also includes a top portion 140, a bottom portion 142 and a central open portion 144. The flange 88 is preferably pivotally secured to an end of the first linear portion 110 of the movable arm 36 by mechanical fasteners 146 such as pins, rods, rivets, snaps, bolts, screws or the like so that the arm 36 may be collapsed when the tree stand hoist 30 is not in use. In it's operational position, the movable arm 36 is rigidly secured to the flange 88. The central open portion 144 of the flange 88 provides an area for receiving the folded movable arm 36 when the tree stand hoist is collapsed or not in use, as illustrated in FIGS. 7 and 8 and as also described in more detail below.

Turning now to FIGS. 4 through 8, operation of the tree stand hoist will now be described. From the collapsed position shown in FIGS. 7 and 8, the flange 62 is pivoted as shown in FIG. 7, and the stationary arm 34 is unfolded at its apex 77 and locked into position using mechanical fasteners 79. The flange 62 is also locked into position with respect to both the stationary arm 34 and the elongated member 32 using mechanical fasteners 64. Accordingly, the stationary arm 34 is locked into position at the distal end 42 of the elongated member 32 and in its operational position, as illustrated in FIGS. 1 through 5.

From the collapsed position shown in FIGS. 7 and 8, the movable arm 36 is pivoted away from the elongated member 32 and unfolded at its apex 116 and locked into position using mechanical fasteners 118. The flange 88 is then locked into position with respect to the movable arm 36 using mechanical fasteners 146. The movable arm 36 is now in its operational position, as illustrated in FIGS. 1 through 5.

To install the hoist 30 on to the tree 20, the movable arm 36 is positioned at a distance apart from the stationary arm 34 so that the arms can easily fit around the diameter of the tree trunk. This is done by positioning the movable arm 36, using the rope 100. As illustrated in FIG. 6B, when the rope 100 is pulled, the locking pin 94 retracts and the pin is no longer in engagement with the aperture 40. While there is tension on the rope 100, the movable arm 36 may be slid away from the stationary arm 34 providing enough space to easily surround the tree trunk. The movable arm 36 can then be locked into this position by releasing the rope 100 and causing the locking pin 94 to engage one of the apertures 40 in the elongated member 32, preferably closer to the proximal end 46 of the elongated member 32.

As illustrated in FIG. 4, with the extension member 56 in place on the proximal end 46 of the elongated member 32, the hoist 30 is positioned, with the arms 34 and 36 encompassing the tree trunk, at the desired height for the tree stand. The arms 34 and 36 may be positioned at an angle on the tree 20 as shown in FIG. 4. As illustrated in FIG. 5, once properly positioned, the rope 100 is pulled, the locking pin 94 retracts away from the aperture 40 and the movable arm 36 slides towards the stationary arm 34 until it is drawn into engagement with the trunk of the tree 20. When such secure engagement is made, the rope 100 is released and the locking pin 94 engages another one of the apertures 40 in the elongated member 32, locking the movable arm 36 in place and securing the tree stand hoist 30 in place on the tree 20.

Further, once movable arm 36 is in place, the proximal end 46 of the elongated member 32 can be lowered, causing the teeth 84 and 86 on the stationary arm 34 and the teeth 132 and 134 on the movable arm 36 to bite into or grip the trunk of the tree, further securing the tree stand hoist 30 into place.

The tree stand is then attached to the hook 126; and the handle 128 of the rope 124 is pulled to lift the tree stand to the height of the arms 34 and 36 positioned on the tree, using the hoist element 38. The rope 124 is then secured to retain the tree stand at the desired height. The hunter may then climb the tree without the added weight of the tree stand and assemble the stand without bearing the weight of the stand during assembly.

When it is desired to remove the tree stand hoist 30 from the tree 20, the hunter climbs down the tree, pulls on the rope 100, which retracts and disengages the locking pin 94 from the elongated member 32. The movable arm 36 is then slid away from the stationary arm 34 and released from the tree using the extension member 56. The extension member 56 is removed and put into a retracted or compact configuration and the tree stand hoist 30 is collapsed to its portable configuration, as illustrated in FIGS. 7 and 8. This is achieved by folding each of the arms 34 and 36, and removing the pins in both flanges to pivot the arms towards the extension member 32.

Turning next to FIGS. 9 through 13, a second embodiment of the present invention is shown. Like the tree stand hoist 30, the tree stand hoist 230 includes an elongated member 232, such as a hollow tube or pole, a stationary arm 234, a movable arm 236 and a hoist element 238.

The elongated member 232 is constructed similar to the elongated tube member 32, and is preferably a substantially straight tubular member having a first, distal end 242, a second, proximal end 246, a top surface 233, a bottom surface 235 and two side surfaces 237 and 239.

The top surface 233 of the elongated member 232 includes a plurality of apertures 240 configured to engage a locking pin on the movable arm 236, as described in more detail below. The apertures 240 are preferably spaced apart and linearly aligned along the length of the elongated member 232. The apertures 240 are of a size corresponding to the locking pin, and the number of apertures will depend on the length of the elongated member 232 and the number of positions desired for the movable arm 236.

An aperture 245 in one or more of the sides of the elongated member 232 is also provided near the distal end 242 of the elongated member 232 for securing the stationary arm 234 thereto.

The second, proximal end 246 of the elongated member 232 includes a coupling 248. The coupling 248 has an end 250 secured to or formed integrally with the elongated member 232 and an end 252 configured with an opening 254 for receiving and securing an extension member 256. Preferably, the extension member 256 is telescoping, and therefore can be expanded or retracted to any length appropriate for the desired positioning and height of the tree stand. The opening 254 in the coupling 248 is of a size and shape sufficient to receive an end 258 of the extension member 256. The coupling 248 can also include apertures 260 for removably securing the extension member 256 in place with pins, snaps, bolts, screws or the like (not shown).

A flange 262 secures the stationary arm to the distal end 242 of the elongated member 232. The flange 262 is preferably integrally formed with the stationary arm 234; however, it may be a separate piece and stationarily secured thereto. The flange 262 is a tubular member configured to fit around the outside surface of the elongated member 232. The flange 262 has a top surface 266, a bottom surface 267 and two side surfaces 269 and 271. Aligned slots 268 are formed in both the top surface 266 and the bottom surface 267 of the flange 262 and are configured to retain a pulley 270 for movably accommodating the rope 200. The top surface 266 and/or the bottom surface 267 of the flange 262 may also include apertures 273 for securing the stationary arm 236 to the apertures 245 formed in the elongated member 232 using removable fasteners 275, such as pins, screws, bolts, snaps, pegs or the like.

The stationary arm 234 is substantially V-shaped and further includes first and second substantially linear portions 272 and 274, respectively and an apex 276 therebetween. Each of the first and second linear portions 272 and 274 includes a plurality of projecting teeth 284 and 286, respectively, preferably formed within an inside surface 285 and 287 thereof. The teeth 284 and 286 are configured to grip the trunk of the tree and secure the hoist into place during use.

The number and precise shape of the teeth 284 and 286 along each of the linear portions 272 and 274, respectively, will depend on the size of the stationary arm 234 and the particular application of the hoist. For example, certain state or local environmental regulations may only permit teeth that do not pierce or puncture the trunk, but rather, merely grip the trunk, and as such, the teeth 284 and 286 can be constructed accordingly, as is well known to those skilled in the art. The stationary arm 234 is also provided with a finger 278 extending from the second linear portion 274.

The stationary arm 234, including the flange 262, first and second substantially linear portions 272 and 274, and the finger 278, are preferably of unitary construction and formed from a single piece of material. However, each piece of the stationary arm, or combination of pieces can be constructed separately and secured together by any means known to those skilled in the art.

Figure 11:
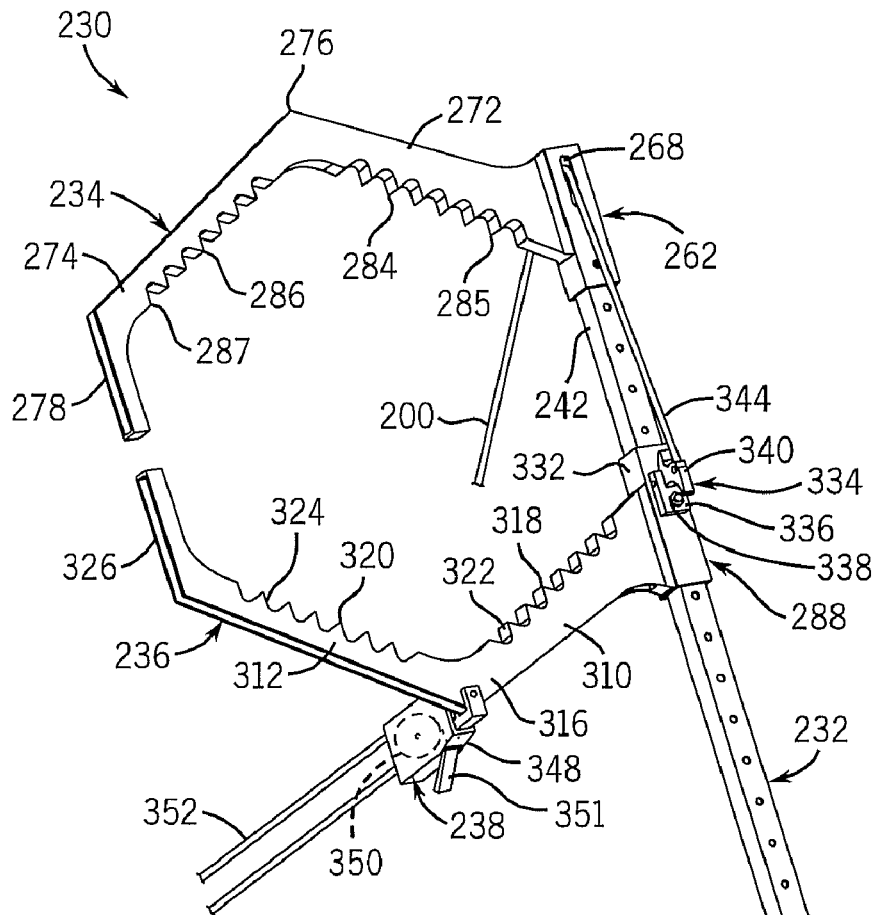
FIG. 11 is a partial perspective view of the tree stand hoist illustrated in FIGS. 9 and 10.
Figure 12:
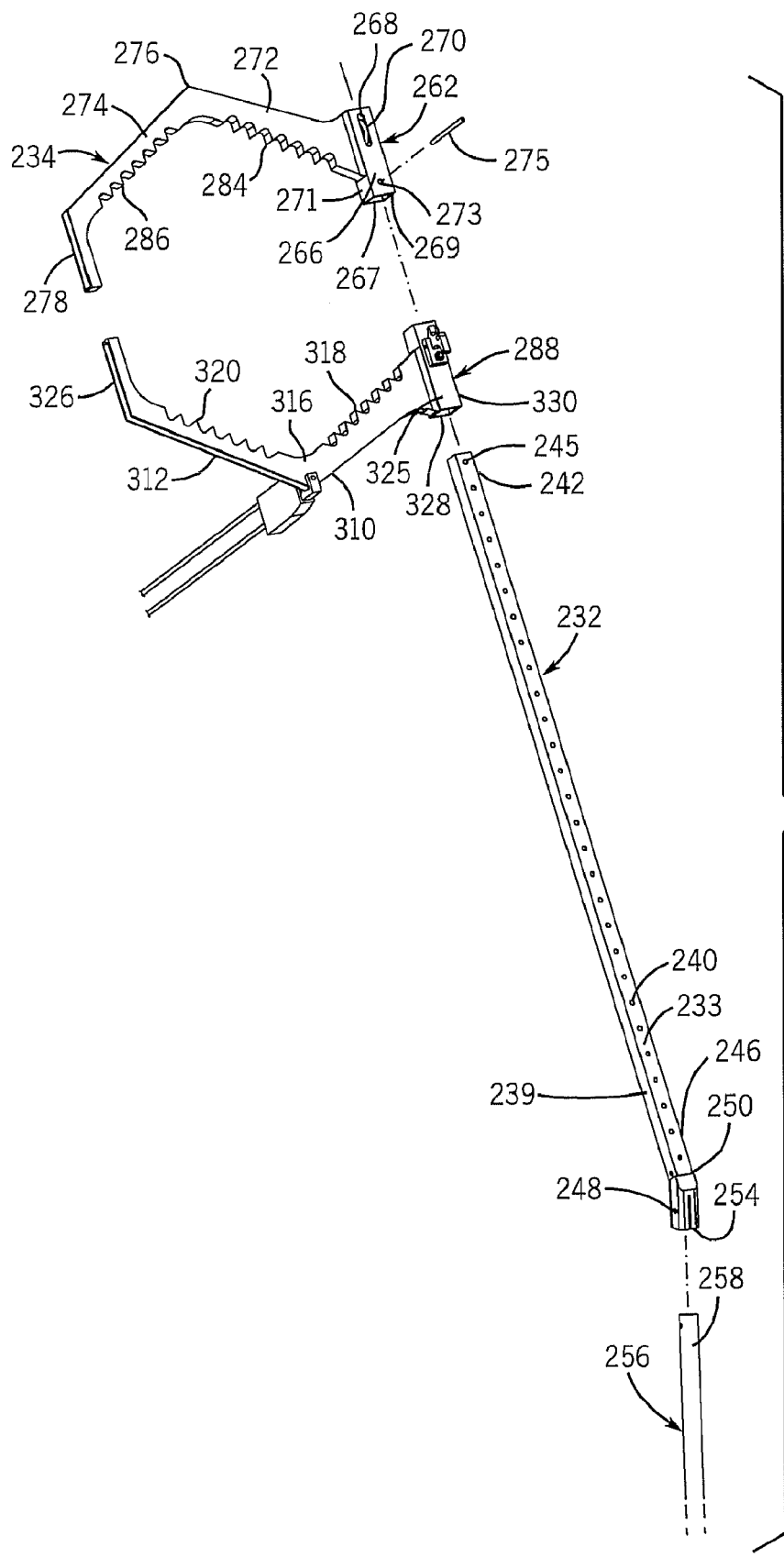
FIG. 12 is a perspective view of the tree stand hoist illustrated in FIGS. 1 through 11, showing assembly of the tree stand hoist.

The movable arm 236 is slidably secured to the elongated member 232 by a flange 288, as will be described in more detail below. As best illustrated in FIGS. 11 and 12, the movable arm 236, like the stationary arm 234, is a substantially V-shaped member including first and second substantially linear portions 310 and 312, respectively, and an apex 316 therebetween. Each of the first and second linear portions 310 and 312 includes a plurality of projecting teeth 318 and 320, respectively, preferably formed within an inside surface 322 and 324 thereof. The teeth 318 and 320 are configured to grip the trunk of the tree and secure the hoist into place during use.

The number and precise shape of the teeth 318 and 320 along each of the linear portions 310 and 312, respectively, will depend on the size of the movable arm 236 and the particular application of the hoist. For example, certain state or local environmental regulations may only permit teeth that do not pierce or puncture the trunk, but rather, merely grip the trunk, and as such, the teeth 318 and 320 can be constructed accordingly, as is well known to those skilled in the art. The movable arm 236 is also provided with a finger 326 extending from the second linear portion 312.

Figure 10:
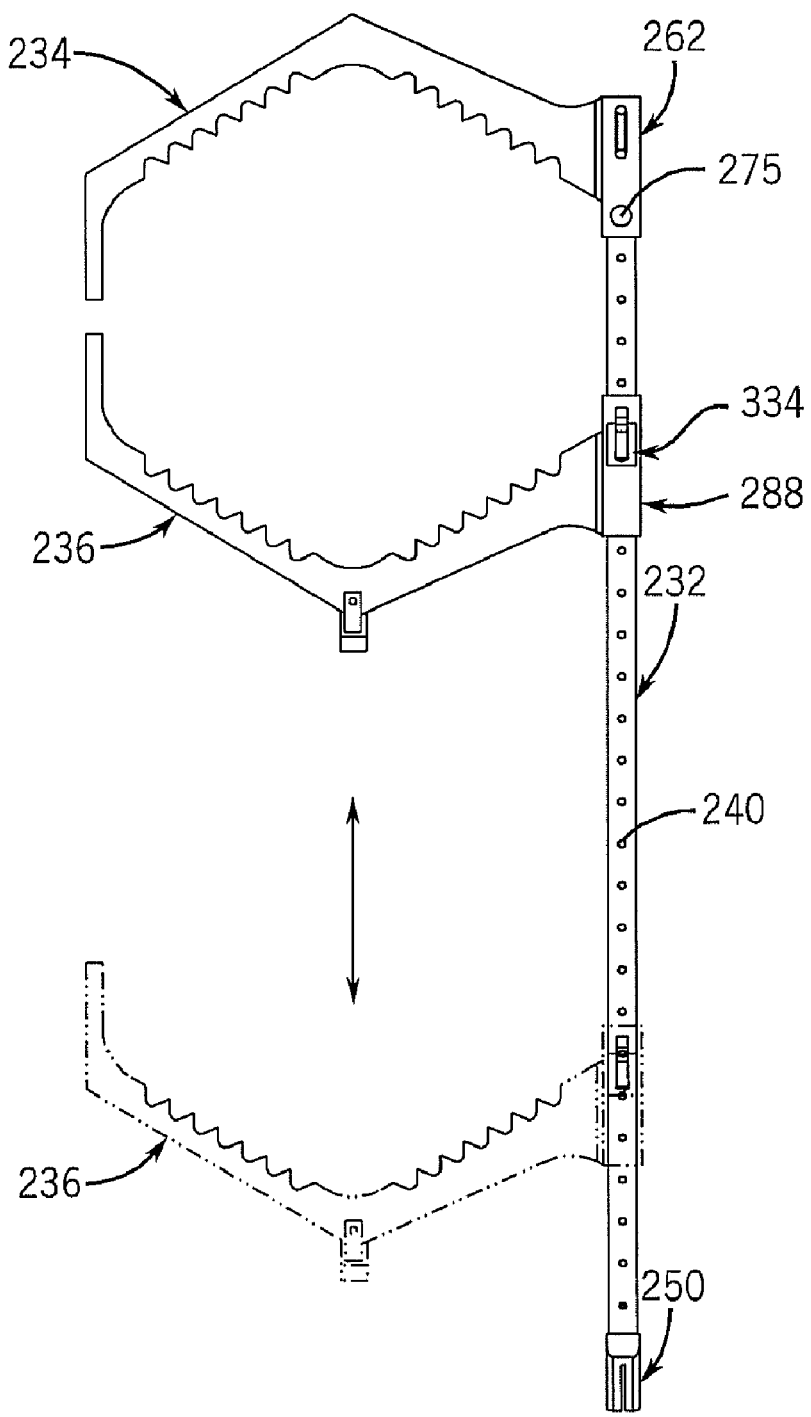
FIG. 10 is a top view of the tree stand hoist illustrated in FIG. 9, showing a movable arm having a plurality of slideable positions along the length of the elongated member.

As best illustrated in FIGS. 10 through 12, and with reference to FIGS. 6A and 6B, the flange 288 of the movable arm 236 is configured substantially similar to the flange 90 of the tree hoist 30, described above. As such, the flange 288 is preferably tubular, having a top surface 325, a bottom surface 328, and opposing side surfaces 330 and 332. The flange 288 is configured to fit around the outside of the elongated member 232 and is capable of sliding back and forth from the distal end 242 to the proximal end 246 of the elongated member 232.

Figure 13:
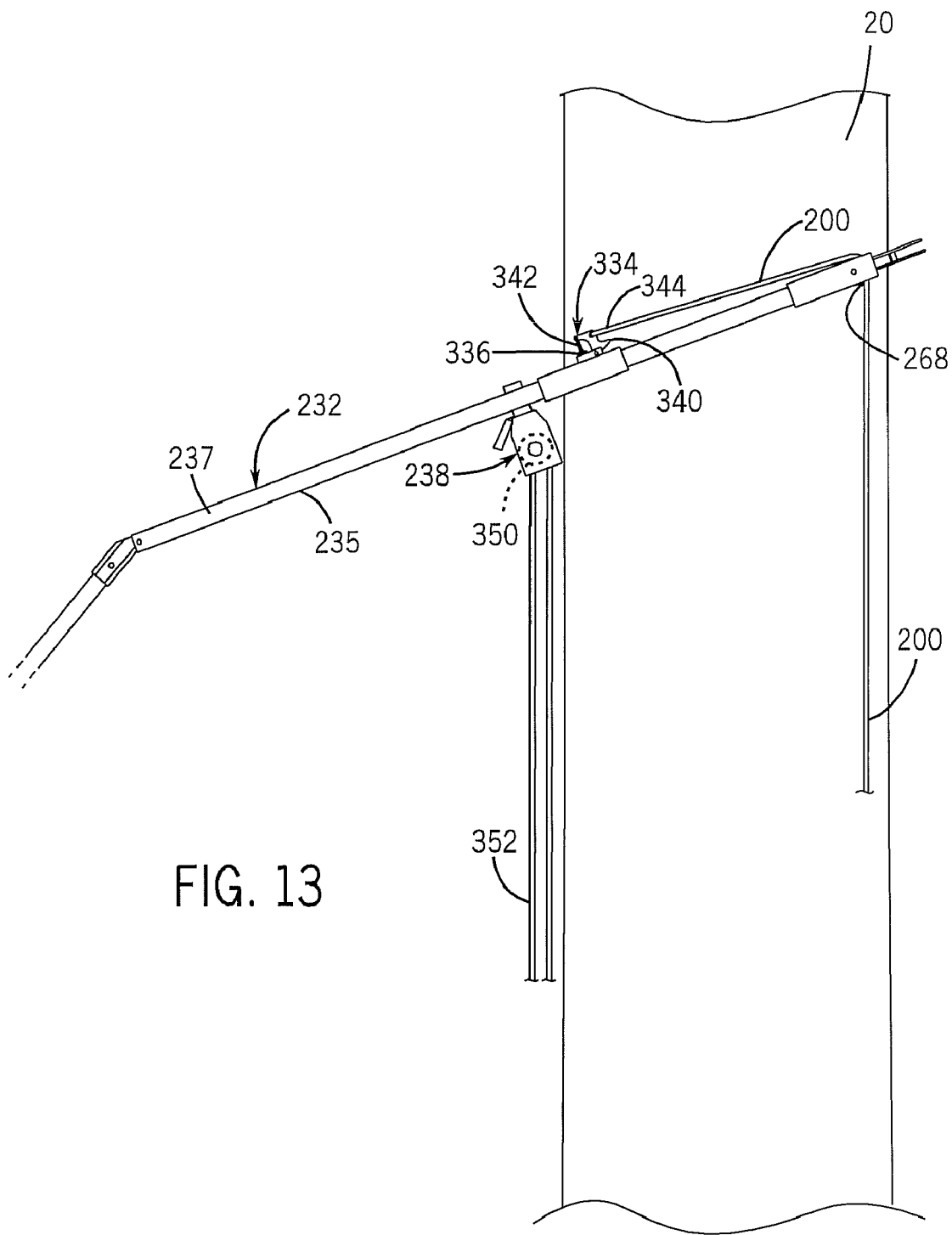
FIG. 13 is a side view of the tree stand hoist illustrated in FIGS. 9 through 12, shown secured to a tree.

As best illustrated in FIGS. 11 and 13 and with reference to FIGS. 6A and 6B, the top surface 326 of the flange 288 includes a positioning mechanism 334 for moving the movable arm 236 and locking it into place along the length of the elongated member 232. The positioning mechanism 334 includes a retractable, spring-loaded locking pin 336, including a biasing mechanism 338, such as a spring, a pivotable element 340 and a linkage 342, such as a ring, connecting the locking pin 336 to the pivotable element 340. An end 344 of the rope 200 is secured to the pivotable element, and is then threaded through the opening 268 in the stationary arm 234 and then through the opening 243 in the elongated member 232.

The locking pin 336 is biased in a locked position, such that an end (not shown in FIGS.) of the locking pin 336 engages one of the apertures 240 within the elongated member 232 when there is no tension on the rope 200. As illustrated in FIG. 6B, when the rope 200 is pulled, the locking pin 334 is in a retracted position, permitting the movable arm 236 to slide back and forth along the elongated member 232.

Preferably, the hoist element 238 is located substantially near the apex 316 of the movable arm 236. The hoist element 238 includes a housing 348, a rotatable pulley 350 disposed therein and a rope or cable 352. A hook or clasp 354 is located at one end of the rope 352 for attaching the tree stand 30 or hunter's gear to the hoist and a handle 356 is secured to the other end of the rope 352 for lifting up the tree stand. The hook 354 and the handle 356 may be any type known to those skilled in the art, provided they are constructed to sustain the weight of the tree stand. A ratcheting mechanism 351 may also be provided for securing the rope 352 in place once the tree stand is hoisted to the desired elevated position.

It will be appreciated by those skilled in the art that the hoist element 238 may comprise any component known to those skilled in the art that will permit the rope 200 to be slidably secured to one of the arms, such that when the tree stand is attached to the hook, applying tension to the handle will result in the tree stand being lifted into the desired elevated position.

The hoist element 238 is secured to the movable arm 236 using a pivoting flange 358 so that the hoist element 238 may be moved to the appropriate angle when attaching the tree stand to the rope 352 and during lifting of the tree stand. The pivoting flange 358 also permits the hoist element 238 to be moved out of the way when the hoist 230 is in its portable position.

In certain preferred embodiments, the pivotable flange 358 may permit the hoist element 238 to be removable from the movable arm 236, for ease of transport of the hoist 230. In addition, the rope 352, hook 354 and/or the handle 356 may be configured to be removable from the hoist element for ease of transport and for ease or repair and/or replacement.

The movable arm 236, including the flange 288, first and second substantially linear portions 310 and 312, and the finger 326, are preferably of unitary construction and formed from a single piece of material. However, each piece of the stationary arm, or combination of pieces can be constructed separately and secured together by any means known to those skilled in the art.

Turning now to FIGS. 9 through 13, in addition to FIGS. 6A and 6B, operation of the tree stand hoist 230 will now be described. FIG. 12 best illustrates a collapsed position of the tree stand 230. In this collapsed and portable position, each of the stationary arm 234, the movable arm 236 and the extension member 256 are removable from the elongated member 232 by removing the fasteners provided therewith. The individual members can then be easily carried in a compact fashion using a bag and then the hoist can be assembled on site.

First, the movable arm 236 is positioned on to the elongated member 232 by sliding the flange 288 on to the elongated member 232. For convenience, the movable arm 236 can be locked into position near the proximal end 244 of the elongated member 232 while the rest of the hoist is assembled.

The flange 262 of the stationary arm 234 is then slid on to the elongated member 232 and is secured at the distal end 242 thereof by threading the removable fasteners 275 through corresponding, aligning apertures 273 in the flange 262 and 245 in the elongated member 232. The rope 200, is then fed through the slot 268 in the top surface 266 of the flange 262, over the pulley 270 and out the slot 268 in the bottom surface 267 of the flange 262.

Next, the extension member 256 is positioned on to the proximal end 244 of the elongated member 232 and secured into position using any removable fastener known to those skilled in the art. Once the extension member 256 is connected, the tree stand hoist 230 is assembled and ready for use, as indicated in FIG. 9.

Figure 9:
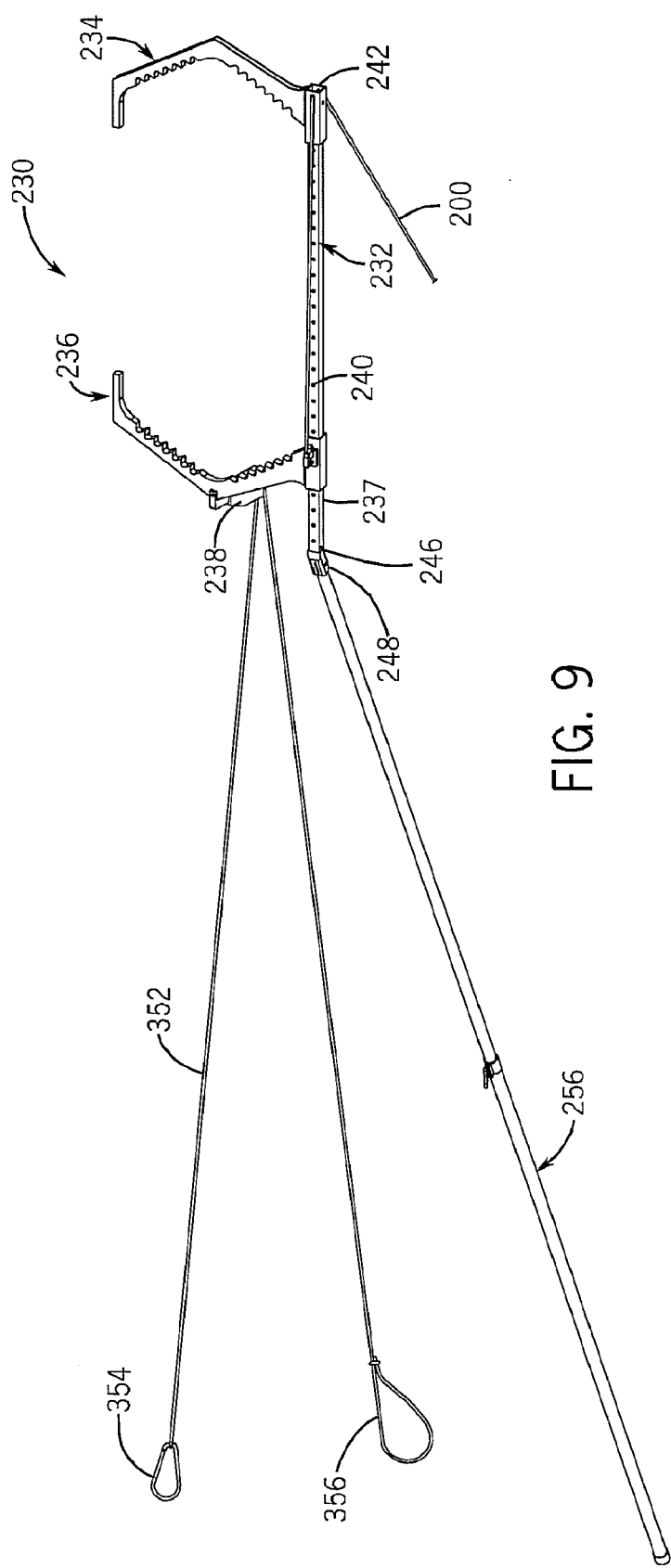
FIG. 9 is a full perspective view of a second collapsible tree stand hoist consistent with the teachings of the present invention, shown with removable arms.

To install the hoist 230 on to the tree 20, the movable arm 236 is positioned at a distance apart from the stationary arm 234 so that the arms can easily fit around the girth or circumference of the tree trunk, as illustrated in FIG. 9. This is done by positioning the movable arm 236, using the rope 200. As illustrated in FIG. 6B, when the rope 200 is pulled, the locking pin 336 retracts and the pin is no longer in engagement with the aperture 240. While there is tension on the rope 200, the movable arm 236 may be slid away from the stationary arm 234 providing enough space to easily surround the tree trunk. The movable arm 236 can then be locked into this position by releasing the rope 200 and causing the locking pin 336 to engage the aperture 240 in the elongated member 232.

As illustrated in FIGS. 10 and 13, with the extension member 256 in place on the proximal end 246 of the elongated member 232, the hoist 230 is positioned, with the arms 234 and 236 encompassing the tree trunk, at the desired height for the tree stand. The arms 234 and 236 may be positioned at an angle on the tree 20 as shown in FIG. 13. As illustrated in FIG. 10, once properly positioned, the rope 200 is pulled, the locking pin 336 retracts away from the aperture 240 and the movable arm 236 is drawn into engagement with the trunk of the tree 20, bringing the movable arm 236 closer to the stationary arm 234. When such secure engagement is made, the rope 200 is released and the locking pin 336 engages another one of the apertures 240 in the elongated member 232, locking the movable arm 236 in place.

Further, once movable arm 236 is locked in place, the proximal end 246 of the elongated member 232 can be lowered, causing the teeth 284 and 286 on the stationary arm 234 and the teeth 218 and 320 on the movable arm 236 to bite into or grip the trunk of the tree 20, further securing the tree stand hoist 230 into place.

The tree stand is then attached to the hook 354; and the handle 356 of the rope 352 is pulled to lift the tree stand to the height of the arms 234 and 236 in the tree, using the hoist element 238. The rope 352 is then secured to retain the tree stand at the desired height. The hunter may then climb the tree without the added weight of the tree stand and assemble the stand without bearing the weight of the stand during assembly.

When it is desired to remove the tree stand hoist 230 from the tree 20, the hunter climbs down the tree, pulls on the rope 200, which causes the locking pin 336 to retract and disengage from the elongated member 232. The movable arm 236 is then slid away from the stationary arm 234 and the hoist 230 is released from the tree using the extension member 256.

When it is desired to transport the hoist 230, the extension member 256, and each of the arms 234 and 236 are removed from the elongated member 256.

One skilled in the art will immediately recognize that the tree stand hoist devices 30 and 230 of the present invention are preferably constructed of a substantially rigid material such as steel, aluminum or another metal material. Other materials may be used for any portion of the tree stand hoists 30 or 230 provided the material permits the arms to rigidly secure to the tree, and of sufficient strength to withstand the weight of the tree stand, the hunter's gear and/or the hunter. Further, one or more of the provided ropes may be replaced with any type of cable rope material, including cotton, nylon, metal wire or cable, or thermoplastic material, as long as the rope material is provided with sufficient strength to withstand the required load, as described above.

It may therefore be appreciated from the above detailed description of the preferred embodiment of the present invention that it provides a compact, collapsible tree stand hoist that permits a hunter to lift a tree stand to the desired height without requiring that the hunter carry or otherwise bear the weight of the tree stand in order to get it into position or during assembly of the tree stand. It can be seen that the present invention provides certain embodiments in which the arms are foldable and inwardly pivotable towards the elongated member, providing a compact package for storing and transporting the tree stand hoist. In certain other embodiments of the present invention, the arms are of a unitary construction and are removable from the elongated member, so that the tree stand hoist may collapsed down to a smaller size for transport.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A tree stand hoist apparatus for lifting a tree stand to an elevated height, the apparatus comprising:
  an elongated member having a distal end, a proximal end and a length therebetween, the elongated member having a surface comprising a plurality of spaced-apart apertures formed along the length thereof;
  a stationary arm pivotally secured to the distal end of the elongated member, the stationary arm configurable between a locked position, wherein the stationary arm extends laterally away from the elongated member, and a collapsed position wherein the stationary arm pivots towards the elongated member;
  a movable arm comprising a positioning mechanism, the movable arm slidably secured to the elongated member and movable along the length of the elongated member between the distal end and the proximal end thereof, wherein the positioning mechanism of the movable arm engages one of the plurality of apertures in the elongated member when the movable arm is in a locked position and wherein the positioning member is disengaged from the one of the plurality of apertures when the movable arm is in a sliding position;

wherein the movable arm is pivotable with respect to the elongated member and configurable between a first, operational position and a second, collapsed position; and a hoist element including a rope pivotally secured to the apex of movable arm.

2. The tree stand hoist as defined in claim 1, wherein each of the stationary arm and the movable arm further comprises a plurality of teeth for engaging the tree.

3. The tree stand hoist as defined in claim 1, wherein each of the stationary arm and the movable arm are substantially V-shaped, having first and second linear portions and an apex therebetween, wherein each of the stationary and movable arms are foldable about the apex thereof.

4. The tree stand hoist as defined in claim 1, wherein the positioning mechanism comprises a spring loaded locking pin and a rope having first and second ends, wherein the locking pin is biased to engage one of the plurality of apertures on the elongated member when the movable arm is in the operational position.

5. The tree stand hoist as defined in claim 4, wherein a first end of the rope is connected to the locking pin and wherein the locking pin retracts from the one of the plurality of apertures in the elongated member when there is tension on the second end of the rope.

6. The tree stand hoist as defined in claim 1, wherein the hoist element further comprises a pulley movably engaged to the rope and a ratchet mechanism, wherein the ratchet mechanism is configured to lock the rope in position on the pulley.

7. The tree stand hoist as defined in claim 1, further comprising an extension member removably secured to the proximal end of the elongated member.

8. A collapsible tree stand hoist configurable between an operational position and a collapsed position, the hoist comprising:

an elongated member having distal end, a proximal end, a length therebetween and a plurality of spaced apart apertures formed along the length of the elongated member on a surface thereof;

a first, substantially V-shaped member having a first end pivotally secured to the distal end of the elongated member, a second free end and a hinged apex therebetween, wherein the first substantially V-shaped member stationarily extends from a side of the elongated member when the hoist is in the operational position and wherein the first substantially V-shaped member folds about its apex when the hoist is in the collapsed position;

a second substantially V-shaped member having a first end slidably secured to the elongated member, a second, free end and a hinged apex therebetween, wherein the second substantially V-shaped member is movably positionable along the length of the elongated member between the distal end and the proximal end thereof when the hoist is in the operational position and wherein the second substantially V-shaped member folds about its apex when the hoist is in the collapsed position; and a pulley mechanism pivotally secured to the apex of one of the first and second substantially V-shaped members.

9. A collapsible tree stand hoisting device configurable between an operational position and a collapsed position, the hoisting device comprising:

an elongated member having an exterior surface, a distal end, a proximal end and a length therebetween;

a first substantially V-shaped member comprising a plurality of teeth, and having a first end removably secured to the distal end of the elongated member, a second, free end and an apex therebetween;

a second substantially V-shaped member comprising a plurality of teeth, the second substantially V-shaped member having a first end movably secured to the elongated member, a second, free end and an apex therebetween, wherein the second substantially V-shaped member is positionable along the length of the elongated member between the distal end and the proximal end thereof; and a pulley mechanism pivotally secured to the apex of one of the first and the second substantially V-shaped members, the pulley mechanism including a cable for securing a tree thereto.

10. The tree stand hoisting device of claim 9, wherein the free end of the first V-shaped member comprises a tubular flange configured fit over the exterior surface of the elongated member near the distal end thereof, wherein the tubular flange of the first V-shaped member is locked into place using at least one fastener when the device is in the operational position and wherein the flange of the first V-shaped member is removed from the elongated member when the device is in the collapsed position.

11. The tree stand hoisting device of claim 10, wherein the tubular member is integrally formed with the first end, second end and apex of the first V-shaped member.

12. The tree stand hoisting device of claim 10, wherein the first V-shaped member further comprises a finger secured to the second end, wherein the finger is integrally formed with the second end and extends at an angle away from the second end.

13. The tree stand hoisting device of claim 9, wherein the first end of the second V-shaped member comprises a tubular flange configured fit over the exterior surface of the elongated member, wherein the tubular flange of the second V-shaped member is slidably positionable along the length of the elongated member when the device is in the operational position and wherein the flange of the second V-shaped member is removed from the elongated member when the device is in the collapsed position.

14. The tree stand hoisting device of claim 13, wherein the tubular member is integrally formed with the first end, second and apex of the second V-shaped member.

15. The tree stand hoisting device of claim 13, wherein the elongated member further comprises a plurality of spaced-apart apertures formed along the length thereof and wherein the flange on the second V-shaped member further comprises a positioning mechanism including a locking pin, wherein the locking pin is biased to engage at least one of the apertures in the elongated member.

16. The tree stand hoisting device of claim 15, wherein the positioning mechanism further comprises a rope having an end secured to the locking pin, wherein the locking pin retracts from the at least one aperture when there is tension on the rope.

17. A collapsible tree stand hoist comprising:

a tubular support member having an outside surface, a distal end, a proximal end and a length therebetween, the support member including a plurality of apertures linearly aligned along the length thereof;
a first substantially V-shaped arm having a first end including a tubular flange removably secured around the outside surface of the tubular support member near the distal end thereof;
a second substantially V-shaped arm having a first end including a tubular flange slidably secured around the outside surface of the tubular support member, the second V-shaped arm positionable along the length of the tubular support member between the distal end and the proximal end thereof;
a positioning mechanism secured to the flange of the second V-shaped member, wherein the positioning mechanism is configured to engage at least one of the plurality of apertures formed in the tubular support member to lock the second V-shape member along the length of the tubular support member; and
a hoisting element pivotally secured to one of the first and the second substantially V-shaped members, the hoisting element including a cable for securing a tree stand thereto.

18. The collapsible tree stand hoist of claim 17, wherein each of the first and second substantially V-shaped arms include a plurality of teeth configured to grip a tree trunk.

19. The collapsible tree stand hoist of claim 17, wherein each of the first and second substantially V-shaped arms are constructed of a single piece of material.

20. The collapsible tree stand hoist of claim 17, wherein each of the first and second substantially V-shaped arms are removable from the tubular support member.

21. The collapsible tree stand hoist of claim 17, wherein the positioning mechanism further comprises a rope, wherein the positioning mechanism is retracted from the at least one of the plurality of apertures formed in the tubular support member when there is tension on the rope.

22. The collapsible tree stand hoist of claim 17, wherein the hoisting element further comprises a pulley movably engaged to the rope and a ratchet mechanism, wherein the ratchet mechanism is configured to lock the rope in position on the pulley.

* * * * *